J. Burt,
Gage Lathe.
N° 59,552.  Patented Nov. 13, 1866.
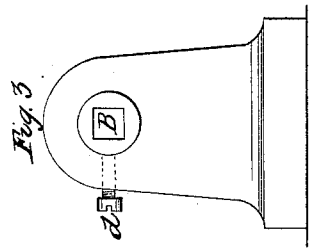
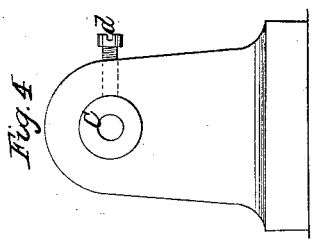
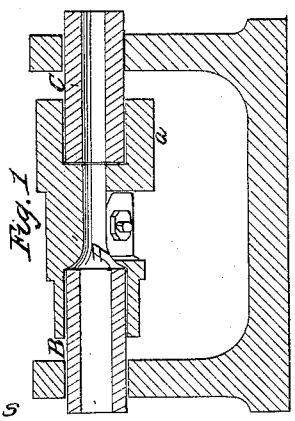
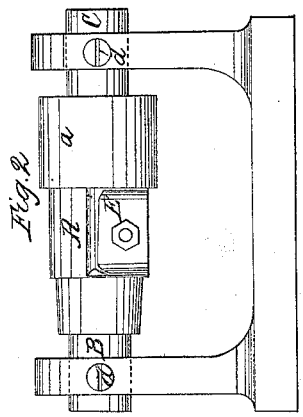
Witnesses
They Tusch
Wm Trown
Inventor:
John Burt
Per Munn & Co
Attorneys

UNITED STATES PATENT OFFICE.

JOHN BURT, OF STURGIS, MICHIGAN.

IMPROVEMENT IN TURNING-LATHES.

Specification forming part of Letters Patent No. 59,552, dated November 13, 1866.

*To all whom it may concern:*

Be it known that I, JOHN BURT, of Sturgis, of the county of St. Joseph and State of Michigan, have invented a new and useful Improvement in Hollow Arbors; and I do hereby declare that the following is a full, clear, and exact description thereof.

My invention consists in so constructing hollow arbors (for rounding square sticks) that only the knife or bit which cuts the wood shall touch the stick, and in forming the bearings upon which the arbor revolves in such a manner that one bearing receives the square stick and holds it from turning, while the other receives it rounded and holds it steady and true, thus performing the work in a much more perfect manner and with much less labor than by the old process; and to enable others skilled in the art to make and use the same, I will proceed to describe its construction and operation, reference being had to the accompanying drawings, which form a part of this specification, and to the letters of reference marked thereon.

Figure 1 represents a longitudinal section of the arbor and boxes. Fig. 2 is a view of the tool complete. Fig. 3 is an end view of one of the bearings, and Fig. 4 an end view of the other.

Similar letters indicate like parts.

A represents the arbor, with a round hole through it, as hollow arbors are usually made, and with the cutter or bit attached in the usual manner. One portion of the arbor, *a*, forms a pulley, from which it is revolved by a belt, or in any manner which may be most convenient.

B is one of the hollow bearings upon which the arbor revolves. The hollow portion of this bearing is square, and the stick to be rounded is introduced into this one.

C is the other bearing, the hollow portion being round. This bearing receives the stick after it has passed the cutter. These hollow bearings are fast in head-blocks formed for the purpose. The arbor only revolves.

The square bearing, or B, holds the stick from turning round while being cut, and the other bearing, C, keeps the rounded portion of the stick steady and true.

The usual hollow cutting-arbor is made in one piece, revolving in boxes like a hollow shaft, the cutter being placed in the shaft as I place it in my arbor. To operate with this kind of hollow arbor it requires two attendants—one to crowd through the stick while he holds it from turning round with his hands, the other to keep the stick steady and draw it through. With my improved arbor it requires but one man to tend it.

The hollow bearing B prevents the square stick from turning, while the other bearing, being entirely at rest, keeps the stick steady and allows it to drop, smoothly finished, from the arbor.

Any one skilled in this kind of work will at once see that the improvement is a very important one.

D represents the stand or head blocks, which hold the hollow bearing and sustain the arbor. *d d* are set-screws to hold the hollow bearings. E is the cutter.

Having thus described my invention, what I claim as new, and desire to secure by Letters Patent, is—

1. A hollow arbor so constructed that only the cutter or bit comes in contact with the stick to be rounded.

2. The hollow bearings B and C, so arranged that one shall receive the square stick and hold it from turning while being rounded, while the other shall receive the stick after being rounded and hold it steady and true, substantially as herein shown and described.

JOHN BURT.

Witnesses:
JOHN B. JACOBS,
WM. M. LOUGHLIN.